US008630882B2

(12) United States Patent  
Isom

(10) Patent No.: US 8,630,882 B2  
(45) Date of Patent: Jan. 14, 2014

(54) IMPLEMENTING AN OPTIMAL INTELLIGENT ENTERPRISE ARCHITECTURE VIA VIRTUALIZATION, INFORMATION INTELLIGENCE, SOCIAL COMPUTING AND GREEN ENVIRONMENTAL CONSIDERATIONS

(75) Inventor: Pamela K. Isom, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/686,538

(22) Filed: Jan. 13, 2010

(65) Prior Publication Data

US 2011/0173035 A1 Jul. 14, 2011

(51) Int. Cl.
G06Q 10/00 (2012.01)
G06Q 99/00 (2006.01)
G06F 21/00 (2013.01)

(52) U.S. Cl.
USPC .......... 705/7.11; 705/300; 705/301; 705/317; 705/348; 705/52

(58) Field of Classification Search
None
See application file for complete search history.

(56) References Cited

U.S. PATENT DOCUMENTS

| 6,915,270 | B1 | 7/2005 | Young et al. |
| 2002/0007388 | A1* | 1/2002 | Bannai et al. ................. 709/104 |
| 2003/0041039 | A1* | 2/2003 | Spool et al. .................... 705/412 |
| 2005/0091396 | A1* | 4/2005 | Nilakantan et al. ........... 709/232 |
| 2007/0143162 | A1 | 6/2007 | Keever et al. |
| 2009/0048981 | A1 | 2/2009 | McBain |
| 2009/0099887 | A1* | 4/2009 | Sklar et al. ......................... 705/7 |
| 2009/0259345 | A1* | 10/2009 | Kato et al. ..................... 700/295 |
| 2009/0281674 | A1* | 11/2009 | Taft ................................. 700/286 |
| 2009/0300173 | A1* | 12/2009 | Bakman et al. ................ 709/224 |
| 2010/0017214 | A1* | 1/2010 | Ambrosio et al. ................ 705/1 |
| 2010/0027552 | A1* | 2/2010 | Hill ................................. 370/401 |
| 2010/0064033 | A1* | 3/2010 | Travostino et al. ........... 709/220 |
| 2011/0055385 | A1* | 3/2011 | Tung et al. .................... 709/224 |

FOREIGN PATENT DOCUMENTS

WO WO 2007068986 6/2007

OTHER PUBLICATIONS

Microsoft Office Project Portfolio Server 2007, Dashboard user manual, Microsoft Corporation, 2006 https://www.am.ohio.gov/PortfolioServer/Manuals/MOPPS-Dashboard.pdf.*
Microsoft Office Project Portfolio Server 2007, Overview user manual, Microsoft Corporation, 2006.*
Arhitectural Strategies for Cloud Computing, An Oracle Paper in Enterprise Arhitecture 2009 http://www.classle.net/sites/default/files/text/36765/architectural_strategies_for_cloud$_{13}$ computing.pdf.*

(Continued)

Primary Examiner — Lynda Jasmin
Assistant Examiner — Octavian Rotaru
(74) Attorney, Agent, or Firm — John R. Pivnichny; Law Office of Jim Boice

(57) ABSTRACT

An intelligent enterprise architecture (LEA) for an enterprise is defined. One or more IEA entry points are selected. IEA entry points represent a starting point for defining the IEA, which is an architectural development process for defining an enterprise computing architecture within a smart computing system. One or more business drivers for pain points in the enterprise are associated with a selected IEA entry point. A business value model is generated and utilized to focus a scope of the business drivers for the selected IEA entry point. An optimal IEA that satisfies the business drivers to ameliorate the pain points in the enterprise is then defined.

14 Claims, 6 Drawing Sheets

(56) References Cited

OTHER PUBLICATIONS

Finagar Peter, Cloud Orinted Business Arhitecture, BPTrends Column, Jun. 2009 http://www.bptrends.com/publicationfiles/ONE%2006-09-COL-Extreme%20Competition-Cloud%20Oriented%20Arch-Fingar-final.pdf.*
Wang et al, Research on Intelligent Decision-Making Operation Modes in Modern Commerce service value chain model, IEEE 2008 http://ieeexplore.ieee.org/stamp/stamp.jsp?arnumber=04564627.*
Mei et al, Topic Sentiment Mixture—Modeling Facets and Opinions in Weblogs, IW3C2, ACM 978-159593-654-7-07-0005, Banff, Alberta, Canada, 2007 http://www2007.org/papers/paper680.pdf.*
Microsoft Office Project Portfolio Server 2007, Optimizer user manual, Microsoft Corporation, 2006 https://www.am.ohio.gov/PortfolioServer/Manuals/MOPPS-Optimizer.pdf.*
Mei et al, Topic Sentiment Mixture—Modeling Facets and Opinions on Weblogs, IW3C2, ACM 978-159593-654-7-07-0005, Banff, Alberta, Canada, 2007.*
Microsoft Office Project Portfolio Server 2007, Optimizer user manual, Microsoft Corporation, 2006.*
Ambrosio et al, Pacific Northwest Grid Wise Testbed Demonstration Projects, Part I, Olympic Peninsula Project, Pnnl-17167 Oct. 2007 http://sites.energetics.com/MADRI/toolbox/pdfs/pricing/pnnl_2007_pacific_nw_gridwise_olympic_peninsula.pdf.*
Lohr Steve, IBM Sets Out to Make a City in Iowa Smarter, NY Times, Sep. 17, 2009 http://bits.blogs.nytimes.com/2009/09/17/the-smartest-us-city-is-dubuque/.*
Makeower Joel, Behind IBM Quest for a Smarter Planet, greenbiz blog, Jan. 3, 2009 http://www.greenbiz.com/blog/2009/01/03/behind-ibms-quest-smarter-planet.*
Rizo et al, Instrumenting the planet, IBM Research and Development, V53, No. 3, 2009 http://ieeexplore.ieee.org/stamp/stamp.jsp?arnumber=05429014.*
Oracle, Adapting to Ever-Changing Technology with a Complete 2 point 0 Solution, an oracle and capgemini white paper, Oct. 2009 http://www.oracle.com/us/products/middleware/user-interaction/037883.pdf.*
IBM; Enterprise Architecture Development and Usage Process; Jan. 24, 2007.
Wang, L. et al.; Research on Intelligent Decision-Making Operation Modes in Modern Commerce Service Value Chain; May 2008.
Andriole, SJ.; The Seven Habits of Highly Effective Technoogy Leaders; Mar. 2007; vol. 50, No. 3.
Ramanathan, J. et al.; The People, the Process or the Technology? Using the Ace Framework to Make Tradeoffs in Service Delivery Improvement; 2009.
C.-H. Chen-Ritzo et al., "Instrumenting the Planet", IBM J. Res & Dev., vol. 53, No. 3, 2009, pp. 1-16.
IBM, "The New Voice of the CIO: Insights from the Global Chief Information Officer Study Executive Summary", IBM, 2011, pp. 1-7, <http://www-935.ibm.com/services/us/cio/ciostudy/pdf/cio_summary.pdf>.
D. F. Ferguson et al., "Service-Oriented Architecture: Programming Model and Product Architecture", IBM Systems Journal, vol. 44, No. 4, 2005, pp. 753-780.
G. Breiter et al., "Life Cycle and Characteristics of Services in the World of Cloud Computing", IBM J. Res. & Dev., vol. 53, No. 4, Paper 3, 2009, pp. 1-8.
V. Krebs, "Social Network Analysis, A Brief Introduction", Orgnet, LLC, Orgnet.com, pp. 1-3, Copyright 2011, Retrieved Jul. 3, 2013.
M. Naghshineh et al., "IBM Research Division Cloud Computing Initiative", IBM J. Res & Dev., vol. 53, No. 4, Paper 1, 2009, pp. 1-10.
R. High, Jr., et al., "IBM's SOA Foundation: An Architectural Introduction and Overview", IBM, Dec. 15, 2005, pp. 1-68.

* cited by examiner

IMPLEMENTING AN OPTIMAL INTELLIGENT ENTERPRISE ARCHITECTURE VIA VIRTUALIZATION, INFORMATION INTELLIGENCE, SOCIAL COMPUTING AND GREEN ENVIRONMENTAL CONSIDERATIONS

BACKGROUND

The present disclosure relates to the field of computers, and specifically to computer systems. Still more particularly; the present disclosure relates to evaluating and defining enterprise architectures.

BRIEF SUMMARY

A computer-implemented method, system and/or computer program product defines an intelligent enterprise architecture (IEA) for an enterprise. One or more IEA entry points are selected. IEA entry points represent a starting point for defining the IEA, which is an architectural development process for defining an enterprise computing architecture within a smart computing system. One or more business drivers for pain points in the enterprise are associated with a selected IEA entry point. A business value model is generated and utilized to focus a scope of the business drivers for the selected IEA entry point. An optimal IEA that satisfies the business drivers to ameliorate the pain points in the enterprise is then defined.

DETAILED DESCRIPTION

Figure 1:
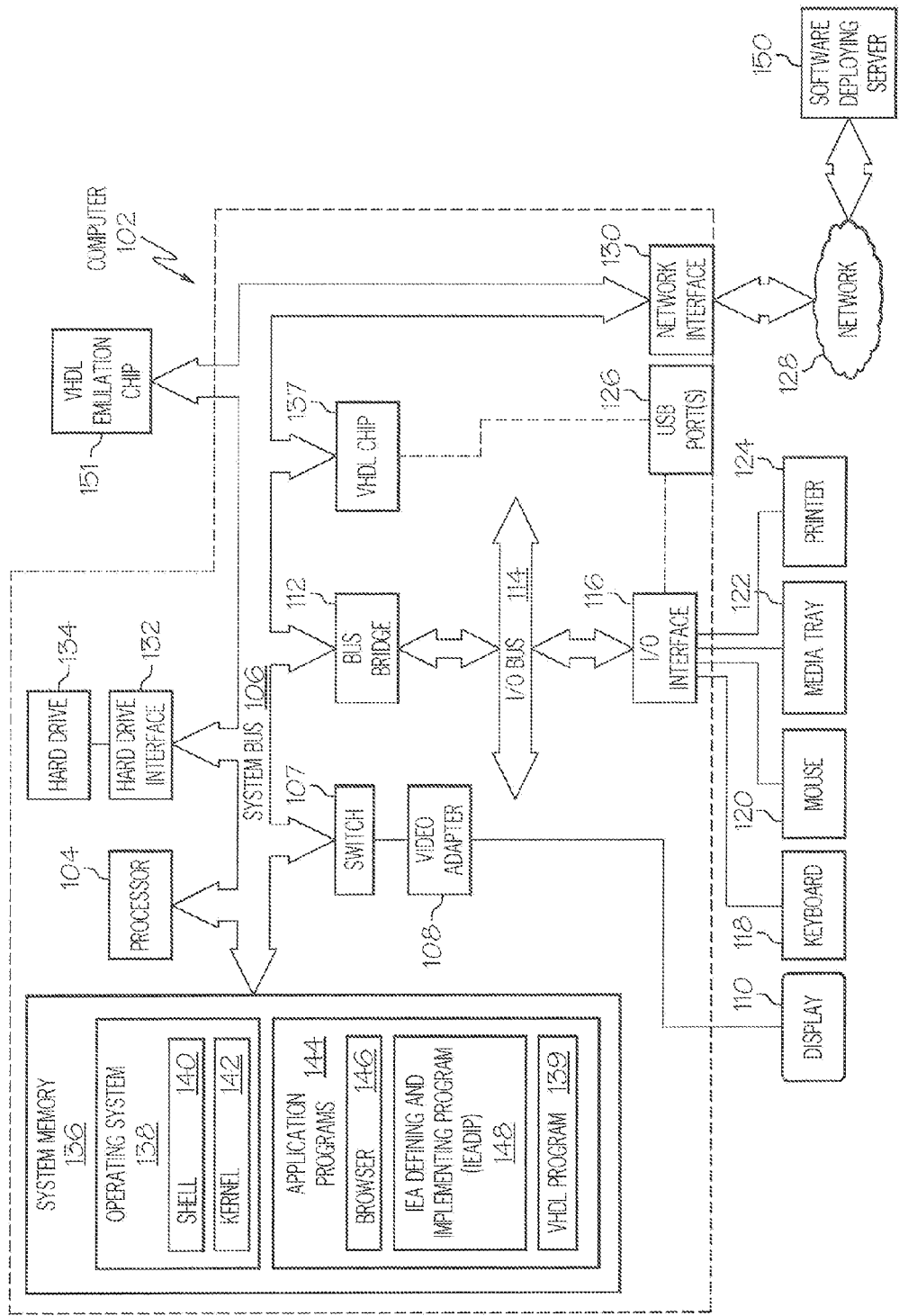
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., intelligent enterprise architecture defining and implementing program—IEADIP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL, chip 137 is not utilized in a manner described below), external USB port(s) 126. While the format of the ports connected to I/O interface 116 may be any known to those skilled in the art of computer architecture, in a preferred embodiment some or all of these ports are universal serial bus (USP) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 1.06. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include an intelligent enterprise architecture defining and implementing program (IEADIP) 148. IEADIP 148 includes code for implementing the processes described below, including those described in FIGS. 2-6. In one embodiment, computer 102 is able to download IEADIP 148 from software deploying server 150, including in an on-demand basis, wherein the code in IEADIP 148 is not downloaded until needed for execution to define and/or implement the improved enterprise architecture described herein. Note further that, in one embodiment of the present invention, software deploying server 150 performs all of the functions associated with the present invention (including execution of IEADIP 148), thus freeing computer 102 from having to use its own internal computing resources to execute IEADIP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from IEADIP 148 causes VHDL program 139 to configure VHDL chip 137, which may be an FPGA, ASIC, etc.

In another embodiment of the present invention, execution of instructions from IEADIP 148 results in a utilization of VHDL program 139 to program a VHDL emulation chip 151. VHDL emulation chip 151 may incorporate a similar architecture as described above for VHDL chip 137. Once IEADIP 148 and VHDL program 139 program VHDL emulation chip 151, VHDL emulation chip 151 performs, as hardware, some or all functions described by one or more executions of some or all of the instructions found in IEADIP 148. That is, the VHDL emulation chip 151 is a hardware emulation of some or all of the software instructions found in IEADIP 148. In one embodiment, VHDL emulation chip 151 is a programmable read only memory (PROM) that, once burned in accordance with instructions from IEADIP 148 and VHDL program 139, is permanently transformed into a new circuitry that performs the functions needed to perform the process described below in FIGS. 2-6.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As described in detail below, the present disclosure describes an intelligent enterprise architecture (IEA), and ways in which foundations can be laid for enterprises to address business complexities that demonstrate a smart computing system, which is instrumented, interconnected, and intelligent. In one embodiment, the IEA is composed of four entry points, referred to as IEA for Cloud, IEA for Social Computing, IEA for Green and Beyond, and IEA for Information Intelligence.

In the present disclosure, the terms "Green," "Architecture Building Blocks (ABBs)," and "IEA Entry Points" are used. The term "Green" is defined as utility use efficiency (primarily energy, but may also reference the usage of water and other resources) and process efficiencies that reduce waste and protect the environment. For example, workload virtualization is considered to be a "green" enabler that can optimize employee productivity, consume less energy, and reduce carbon emissions. "ABBs" are defined as standard reusable elements of an enterprise and an IT enterprise architecture. ABBs can be components or nodes (conceptual aggregations of component instances). "IEA Entry Points" are defined as a starting point for defining an IEA and its specialized services (e.g. IEA for Social Computing).

IEA Entry Points

Figure 2:
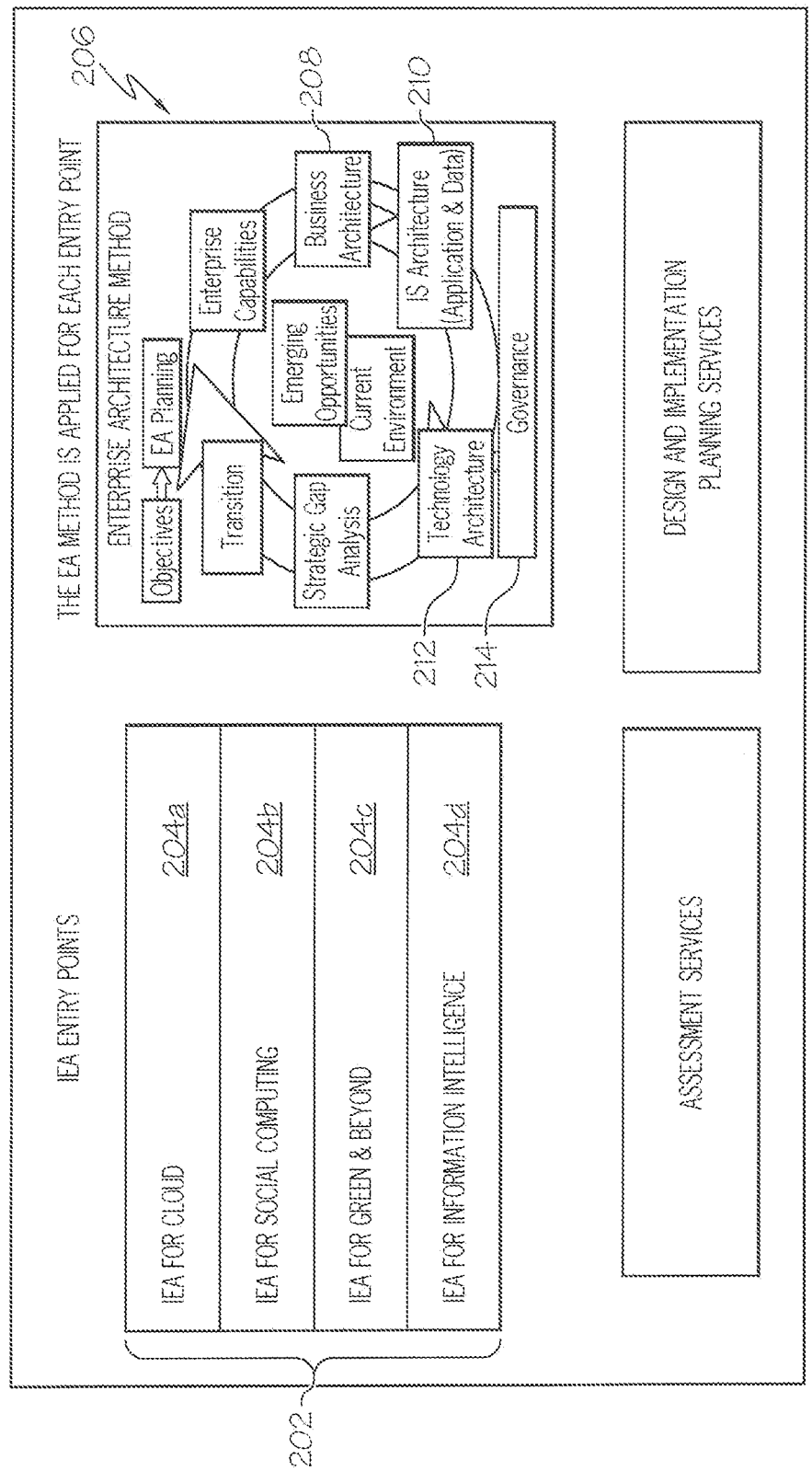
FIG. 2 illustrates exemplary intelligent enterprise architecture (LEA) entry points.

With reference now to FIG. 2, exemplary IEA entry points 202 are depicted. The entry points are IEA for Cloud 204a, IEA for Social Computing 204b, IEA for Green and Beyond 204c, and IEA for Information Intelligence 204d. Each of the IEA entry points 202 has solution accelerators that facilitate IEA definition and implementation planning activities. Although not pictured, in one embodiment security and mobile technologies affect all of the IEA entry points 202 and are an overall part of the IEA definition. Throughout the present disclosure, the term "cloud" is used in reference to cloud computing, an approach to computing in which scalable and often virtualized systems are provided as a service over a network.

IEA for Cloud 204a is an entry point for IEA for Cloud services that can be used in an enterprise's architecture. IEA for Cloud services enable delivery and consumption of: 1) Business Processes as Cloud Services (often referred to as BPaaS, which stand for business processes as a service)—pre-defined business processes that are executed in part or all by the provider on behalf of the consumer (e.g. loan origination processes or help desks); 2) Software Applications as Cloud Services (SaaS)—pre-defined applications, also referenced as Software as a Service (e.g. see Salesforce.com); 3) Platforms as Cloud Services (PaaS)—pre-defined middleware systems such as test platforms; and 4) Infrastructure as Cloud Services (IaaS)—pre-defined infrastructure (or technology) components that provide computational and storage infrastructure as a centralized, location-independent service.

IEA for Social Computing 204b is an entry point for IEA for Social Computing services that can be used in an enterprise's architecture. IEA for Social Computing services enable global collaboration among clients, partners, and supply channels, and encompasses virtual-world building blocks and design techniques. The capabilities can enable unified collaborations within enterprises and throughout its supply channels.

IEA for Green and Beyond 204c is an entry point for IEA for Green and Beyond services that can be used in an enterprise's architecture. IEA for Green and Beyond services enable green capability (as defined above) within and across the enterprise. The term "Beyond" indicates that the use of IT extends beyond the data center and encompasses activities such as smart grid integration, along with process efficiencies such as recycling and reuse. Control and monitoring of utility consumption in buildings within a city is an example of an IEA for Green and Beyond scenario. Thus, the IEA described here can be used to describe the dashboard strategies for monitoring the city, and contributes to the building management and performance planning that drive IT and security investments.

IEA for Information Intelligence 204d is an entry point for IEA for Information Intelligence services that can be used in an enterprise's architecture. IEA for Information Intelligence services enable analytics and mining of information for faster and more precise decision making. IEA for Information Intelligence supports Information on Demand (IOD) and Business Analytics and Optimization (BAO) business intelligence strategies.

In one embodiment of the present disclosure IEA augments a traditional or existing enterprise architecture (EA) of an enterprise. Thus, as depicted in FIG. 2, an enterprise architecture (EA) method 206 is applied for each of the IEA Entry Points 202. More specifically, EA method 206 is utilized by each of the IEA entry points 202 and new IEA capabilities are added to address business needs. The number of domains (or pillars) varies depending on the EA method, and details with respect to each of the domains vary depending on the focus (e.g. a social computing governance focus).

Four domains (depicted in FIG. 2 as elements 208, 210, 212, and 214) are common across most EA methods, including the exemplary EA method 206 depicted in FIG. 2, and each domain has a set of work artifacts and activities. Business Architecture 208 defines the business strategy, governance, organization, and key business processes of the organization. Information Systems (IS) Architecture 210 entails both Application and Data Architecture. Application Architecture provides application systems to be deployed and provides the interactions between the application systems and business processes. Data Architecture describes the structure of the logical and physical data assets of an organization and management resources. Technology Architecture 212 describes the hardware, software and network infrastructure needed to support the deployment of core, mission-critical applications. Governance 214 describes the managing, monitoring, and steering, a business and IT to deliver business outcomes.

In order to implement the IEA described herein, supplemental IEA work artifacts and activities are utilized. These IEA work artifacts and activities include: Business Value Models (BVMs), Insight Assessments, the Intelligent Enterprise Architecture Technology Framework (IEATF), and IEA Governance and Management (IEAGM).

Business Value Models (BVM) and the Modeling Technique

Figure 3:
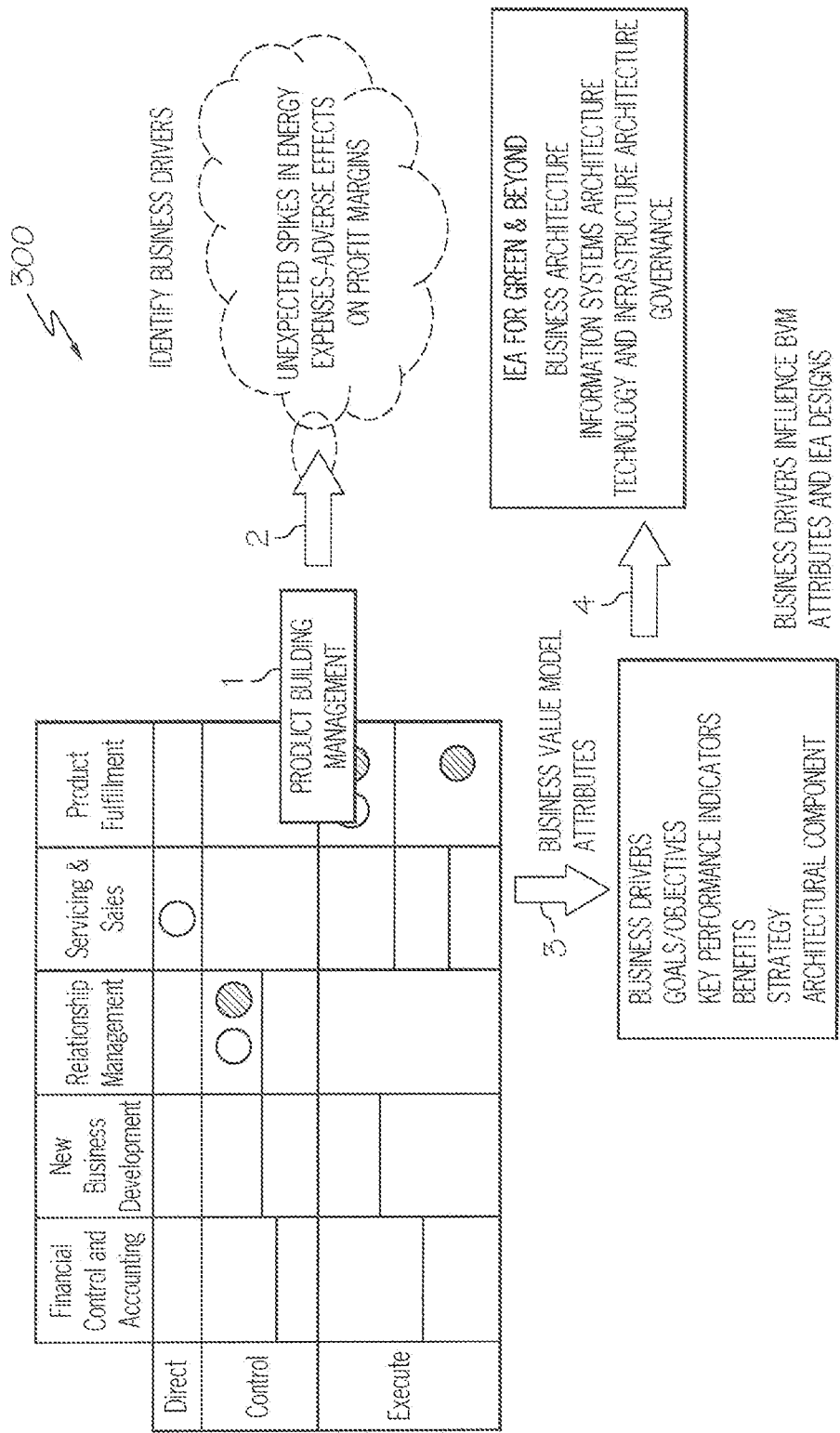
FIG. 3 depicts an exemplary business value model (BVM) process.

One of the principles of IEA involves the generation of business value as outcomes of the IEA. Business value modeling is a technique for deriving business value. Business drivers are typically identified with client pain points (i.e., difficulties that motivate clients to seek solutions); therefore, when business drivers are addressed (along with other IEA requirements), the client pain points are mitigated, which means that value is realized. One approach for commencing the BVM process is to reference the business model or component business model (CBM) in order to focus the scope of the business drivers for the selected entry point. FIG. 3 illustrates the BVM process 300 in four steps.

In step 1 (upper left of FIG. 3), a review of the business model or component business model is conducted in which business organization and delivery commitments are identified, and IEA value components determined. In the example shown in FIG. 3, the value component is Product Building Management.

In step 2, information on the business drivers are captured. In the example depicted, a business driver involves unexpected spikes in energy expenses that are contribute to adverse effects on profit margins. In step 3, the BVM is completed where, in most cases, the business drivers influence the other attributes including the business goals, key performance indicators (KPIs), benefits, and strategy.

Finally, in step 4, the BVM becomes an input to the all of the IEA domain designs but, in particular, Business Architecture and Governance. A framework for traceability of each BVM entry to architectural components, and throughout the delivery lifecycle, is provided in the BVM work artifact.

A number of modeling techniques can be used to capture information on the Business Architecture, including process narratives, business scenarios, organizational charts, and enterprise information models. One work product, the Business Activity Model (BAM), is used to help define how a business currently operates or would like to operate in the future. It provides a decomposition of all levels of business activities in the enterprise or within the scope of the business unit. The BVM supplements BAM activities.

IEA Insight Assessment

The IEA Insight Assessment evaluates each of the architecture domains and determines the related actions necessary to achieve client objectives based on the entry points selected. As an example, in a case in which the IEA for Social Computing is selected, the Insight Assessment might determine and recommend the use of a dedicated private computing cloud that hosts social computing infrastructures in an effort to standardize the social computing portfolio and enterprise delivery model. The assessment results could include a transition plan for defining and implementing the IEA. The engagement approach for conducting the assessments is collaborative, and workshops and social computing applications are recommended to facilitate innovation and interaction among people. Business Value Modeling activities are recommended as a part of the assessment process.

Intelligent Enterprise Architecture Technology Framework (IEATF)

The IEATF describes the technology services and infrastructure required to support the business and strategic execution roadmap (i.e. plan) of an enterprise. IEATF is an expansion of an Enterprise Technology Framework (ETF) that models current and future technology strategies at conceptual, logical, and physical levels. One principle of an IEA is that the ABBs must embody the supported smart computing system characteristics. These characteristics are documented in the IEATF as specifications for detailed component designs. In addition, the IEATF contains a portfolio of information system (IS) and technology building blocks that support the various entry points (e.g. IEA for Cloud) and that provides a chief information officer (CIO) a view of his or her technology landscape. The IEATF building blogs also support a repository of agreed-upon principles, standards, and components and the foundation for the state of future IT systems. Other characteristics include users, interfaces, current and planned implementations, and dependencies. The IEATF also specifies whether an ABB (or its decomposed components) are to be provided as cloud services, consumed from other sources, or both.

Figure 4:
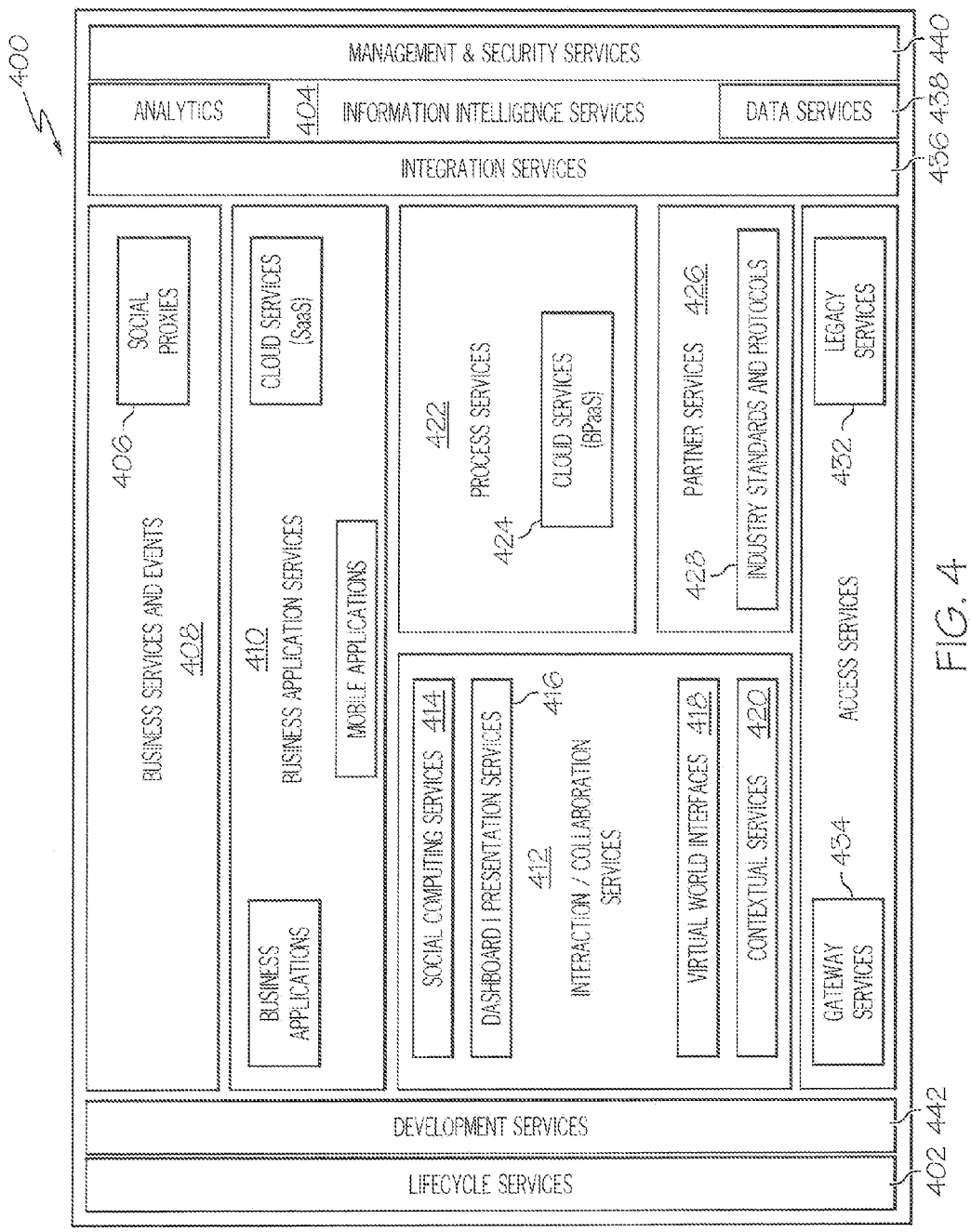
FIG. 4 illustrates exemplary architecture building blocks (ABBs) of an intelligent enterprise architecture technology framework (IEATF) for an LEA for Social Computing Entry Points from a Technology Architecture point of view.

FIG. 4 presents an example of the ABBs of an IEATF with emphasis on the Information Systems Architecture of an IEA for Social Computing. Described below are "IEA Usage Scenarios and Considerations—per Entry Point," which provides elaborations of two IEATF models with summarized ABB descriptions. Before examining these descriptions, however, additional details to of features found in and used by IEA are now presented, including IEA governance and management (IEAGM) and core principles and characteristics of IEA.

IEA Governance and Management (IEAGM)

The intent of IEAGM is to enable use, development, and growth of the IEA. IEAGM adds enablers to an existing EA or SOA (service-oriented architecture) governance framework to encourage adherence to IEA principles, policies, and standards. IEAGM includes resource requirements for stakeholders in an architecture—who can maintain the IEA and adopt it across projects.

IEAGM defines organizational structures such as steering committees, architecture review boards, and delivery review techniques for a given entry point. For example, the CIO who assumes responsibility for improving the environmental footprint of his/her enterprise can reference his/her IEA for a description of a green governance board along with suggested roles, policies (e.g. system responses to carbon emission safety, yield, and danger zone entry), tooling suggestions (e.g. instrumentation for measuring the amount of water required to produce goods and/or to detect a sudden deterioration (e.g., drop in quality and/or quantity) in water supplies), and asset and decision management guidelines. Thus, IEA augments EA utilizing IEA work artifacts and activities. Next described are IEA principles and characteristics that drive the IEA work artifacts that were just described.

Core Principles and Characteristics of IEA

As discussed above, IEA exhibits smart computer system characteristics while also bringing business value to the enterprise. When these principles are applied, they become characteristics of an IEA. Presented now are characteristics of such a smart computing system. The value aspects are addressed by conducting business value modeling, a technique for driving business value as outcomes of the IEA. The process of deconstructing an enterprise into its constituent parts, and organizing in new ways, also drives business value. This can be accomplished by conducting domain analysis while defining the IEA for the various entry points, as described throughout this disclosure.

In particular, the IEA exhibits the instrumented, interconnected, and intelligent characteristics of the smart computing system. This means that each of the IEA entry points contains ABBs that enable the necessary instrumentation ("instrumented") for improved situational awareness of the enterprise. Additionally, IEA enables global connectivity ("interconnected") of people, processes, and information services (IS), which strengthens the enterprise system performance, employee productivity, and the value of the business. As an example, IEA for Social Computing contains ABBs and strategies that can enable collaboration between employees, consumers, and clients, facilitating a team's ability to work smarter. The IEA entry points that focus on interconnectivity are IEA for Cloud and IEA for Social Computing.

The third characteristic that an IEA exhibits is intelligence ("intelligent"). IEA for Information Intelligence contains ABBs that can enable enterprises to assess different dimensions of information so that they identify emerging business opportunities, and threats, and make pertinent decisions. The next section provides elaborations of IEA usage scenarios in an effort to help the reader understand how to apply IEA.

IEA Usage Scenarios and Considerations—Per Entry Point

Presented now are IEA usage scenarios and considerations, which demonstrate in an exemplary manner how IEA can be applied to solve current and emerging business challenges. Presented herein are key steps required to define IEA entry points, including IEA for Cloud, IEA for social computing, IEA for Green and Beyond, and IEA for Information Intelligence.

IEA for Cloud

IEA for Cloud augments an enterprise architecture (EA) with capabilities that enable organizations to dynamically provision and de-provision IT operations by providing the architectural structure, delivery roadmaps, and guidance for cloud computing services adoption. IEA for Cloud aligns business and technology, and identifies the impact of cloud computing services on all of the architecture domains. Preconfiguring the enterprise architecture for cloud enables an organization to expand globally by utilizing computing resources as a utility. This also makes an enterprise more adaptable to changing business models.

Described herein, for exemplary purposes, are four types of cloud computing services: Business Processes as Cloud Services (BPaaS); Software Applications as Cloud Services (SaaS); Platforms as Cloud Services (PaaS), and Infrastructure as Cloud Services (IaaS). Each of these cloud services can be enabled by one or more architecture domains. For example BPaaS may be thought of as residing in the Business Architecture at design time; while at run-time, the capabilities can be enabled by IS architectural building blocks and components.

Exemplary steps taken to define an IEA for Cloud are as follows. First, determine the enterprise capabilities and the types of cloud services that are desired for the enterprise. Second, define enterprise cloud deployment and consumption strategies; e.g. on-premise (private) deployment, externally hosted (public) deployment, or a combination of the two (hybrid). Third, describe the current and future business and technology ABBs for each of the architectural domains and then identify the candidate cloud ABBs. Given that the Technology Architecture and other domains can be cloud enabled in their entirety (for example, as IaaS), this approach provides a holistic view of the enterprise architecture, interdependencies, and the technical impact of enterprise cloud enablement. ABB specifications are captured using the IEATF work artifact (described earlier) that, in addition to technological specifications, identifies whether an ABB and its components are intended to be provided as cloud services, consumed from other sources, or both. The IEA for Cloud activities involve preliminary identification and cataloging of cloud services that will be made available as services offerings. Fourth, capture enterprise service level requirements, agreements, and performance targets (e.g. enterprise KPIs). Fifth, define or update the IEAGM (described above) to include IEA for Cloud principles and standards, and include plans for validating conformance and decision making. Sixth, produce the transition plan and roadmap for implementing the IEA for Cloud. IEAGM will describe policies that address global distribution of services, and asset management. Entry and exit policy considerations for provisioning and de-provisioning cloud services (for example standardized actions that must occur when a cloud service expires) are one of many capabilities of an IEA for Cloud.

IEA for Social Computing is now presented, as well as how the IEATF work product can be applied to generate and transform the IS landscape of an enterprise.

IEA for Social Computing

An enterprise's response to participation in social computing has become an element of growth and innovation. Online collaboration platforms are fundamentally changing the way employees work due to social-computing-based communications and the global spread of information. The following description presents an exemplary process in which an IEATF can be produced to define an IEA for Social Computing. In this example, the focus of the IEATF is on the IS (applications and data only), and the ABBs (illustrated in FIG. 4) necessary for social computing enablement and sustainability. The Technology Architecture of an IEA for Social Computing (although not pictured) is also used to complete the IEATF. Also provided herein are brief descriptions of each ABB, while more detailed components and specifications are in an IEATF deliverable.

In one embodiment, three business collaboration patterns are addressed by IEA for Social Computing: Business-to-Consumer (B2C) for external collaborations between employees, partners, and consumers; Business-to-Business (B2B) enablement between employees and partners; and Employee-to-Employee (E2E) collaborations. These patterns are explored in an effort to determine the enablers for social computing deployment (e.g. in a public cloud computing system).

In the example IEA for Social computing 400 shown in FIG. 4, there is intended sharing of an enterprise IS landscape, standard ABBs, and design considerations for defining IEA for Social Computing 400. All depicted elements except for lifecycle services 402 and information intelligence services 404, are architecture building blocks (ABBs) that enable social computing in the enterprise. The ABB, its components, and the placement of these components can vary depending on the enterprise standards and the style chosen for graphical presentation. ABB refinements, decomposition and relationships between ABBs should be captured in the IEATF deliverable.

Business Services such as Social Proxies 406 and Events 408 (e.g. a user enters the room) enable enterprise stakeholders to view, depict, and model digital interactions of people, processes, and social activities.

Business Application Services 410 such as CRM (customer relationship management) and SaaS cloud services provide application functionality. Organizations may choose SaaS in an effort to optimize software expenses by reusing proven solutions. IEA for Social Computing, therefore, includes Mobile Applications as a core component of Business Application Services.

Interaction/Collaboration Services 412 facilitate and enhance communications and can be utilized to create digital communities. IEA for Social Computing 400 uses Interaction/Collaboration Services 412 to view relative information as well as to monitor business operations and events that emerge from user inputs. Social Computing Services 414 may reside within an enterprise or they may be hosted outside of an enterprise. Dashboard Services 416 provide visual representations of information according to a user's preference. Virtual World Interfaces 418 enable the representation of computer-based simulated environments, which allow users to interact using avatars. With IEA, contextual services 420 are considered as part of the Interaction/Collaboration ABB 412. Contextual service 420 provides the geographic location of a user (e.g. via GPS or cell-phones), and it can provide the "status" of a user in relation to his or her availability for participation (e.g. a user may be in a meeting). Contextual services 420 can also provide information on the customized wants and needs of the user.

Process Services 422 are used by Social Computing applications in an effort to fulfill a human work-flow or automated business process. The example illustrates BPaaS Cloud Services 424 as a component and architectural design point in which all or a portion of an the social-computing-related business processes of an enterprise (e.g. on-line service centers) can be offered or used with a cloud-computing model.

Partner Services 426 enable integration of business partners in the overall IEA design. Industry standards and protocols 428 can be utilized to facilitate information exchange across building systems.

Access Services 430 elevate legacy application functions (e.g. CICS—Customer Information Control System, transactions) into legacy services 432 in order to fulfill a business process. These services may also be referred to as application modernization services. Gateway services 434 are example Access Services that controls and directs entrance into the IEA for Social Computing ecosystem.

Integration Services 436 mediate, transform, and direct the flow of information throughout the enterprise for access and display on social computing interfaces. A smart grid, in which energy consumption points are remotely monitored and metered, is an example integration service that has the responsibility of managing and distributing electrical power. Social computing applications (as well as the consumer) can be a provider of information for how such a smart grid is implemented.

Information Intelligence Services (IIS) 404 process data provided by social computing applications and can apply analytics and decision support techniques to determine real-time insights and actions. As an example, IIS can help people locate resources and team to provide the collective intelligence that is required for solving problems and addressing new market challenges. Data Services 438 (e.g. sensor applications) can facilitate sense-and-respond activities in real-time. For instance, notifications can be sent to a user's mobile device alerting the user that pollen levels in an area are high and alert the user about the probability of an allergic reaction based on published user-profiles. IEA for Information Intelligence (described below) is an entry point for IIS.

Management and Security Services 440 describe the foundational quality of service (QoS) ABBs and components to sustain the social computing environment. Security presents a concern for enterprise stakeholders, particularly when corporate data is housed by others. IEA for Social Computing provides the structure for enterprises to early address traditional and emerging security threats—including authentication and access control, isolation management (inter-tenant and multi-tenant administration of systems from different enterprises that are hosted on the same physical hardware), and integrity management.

Development Services 442 can be utilized to architect the IEA for Social Computing and to generate and test social computing integration. Lifecycle Services 402 (e.g. policy and automated configurations) can be utilized to standardize the building and deployment of the IEA for Social Computing components across the enterprise. IEAGM can be applied for policy enforcement.

IEA for Social Computing 400 may be considered as part of an enterprise strategy for effectively managing digital-base social communities, and as a mechanism to reach energy-efficient objectives. IEA for Green and Beyond is another IEA entry point, and is now discussed.

IEA for Green and Beyond

IEA for Green and Beyond provides business and IT strategies and ABBs for "greening" environments such as data centers and buildings, with respect to waste, carbon output, utility, and management of assets. Note that the term greening is often used to denote the enhancing of a system or business with respect to environmental protection concerns. The core building blocks of IEA for Green and Beyond from the point of view of a Technology Architecture domain is now presented. Several strategies for greening the IT environment are also provided.

Figure 5:
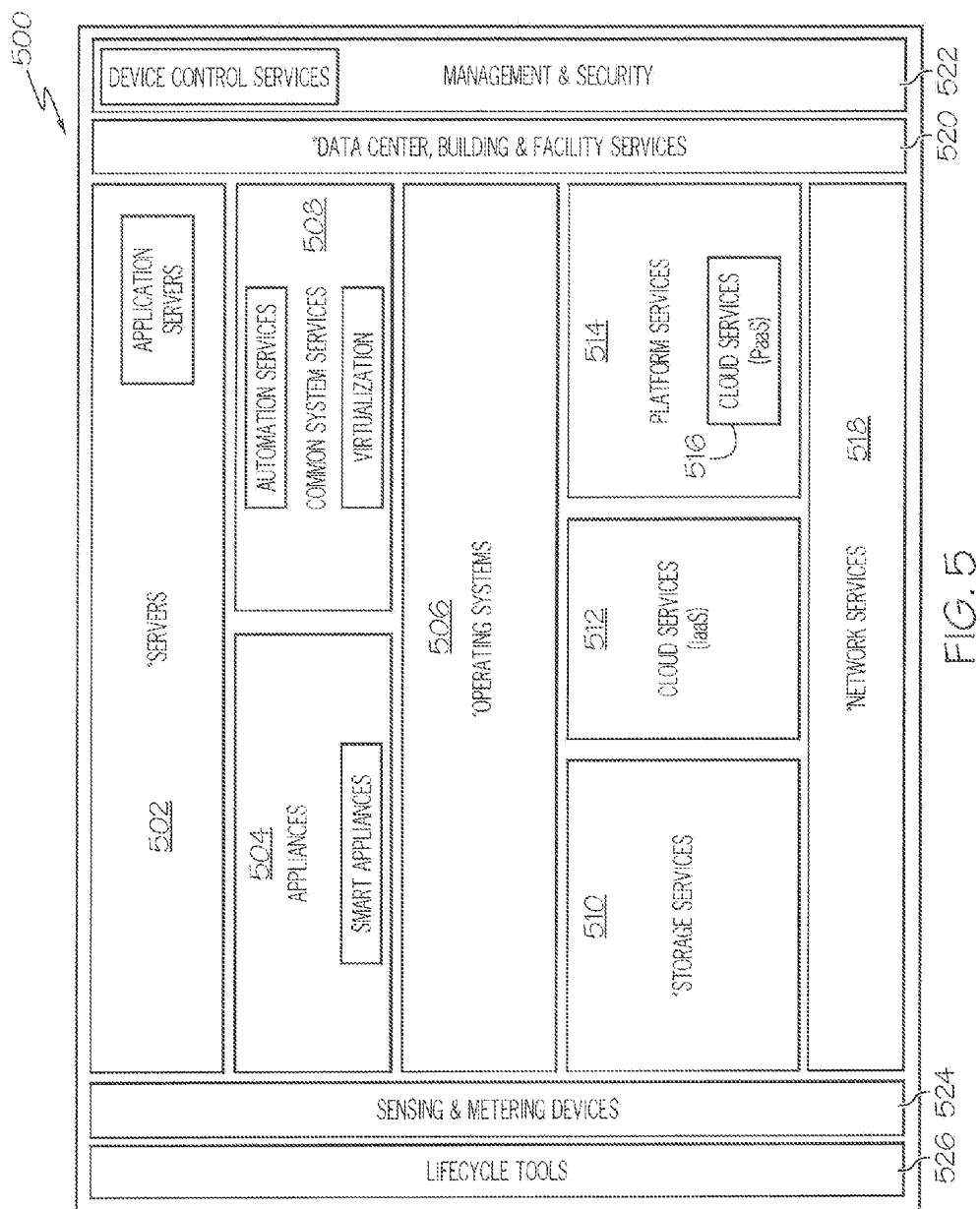
FIG. 5 depicts exemplary ABBs of an IEATF for an exemplary LEA for a Green and Beyond Entry Point from a Technology Architecture point of view.

FIG. 5 illustrates an exemplary IEA for Green and Beyond 500 from a Technology Architecture (e.g. infrastructure) point of view. The asterisks next to an ABB indicate requisite compliance with industry standards such as EPA standards for servers. Buildings that have achieved certifications according to green standards can contribute to energy savings, and less pollution and carbon impact on the environment.

The use of servers 502 that meet EPA requirements is one way to optimize energy usage. Another way to optimize energy usages is through virtualization. Server virtualization allocates only the server resources required for an application and can save in CPU (central processing unit) utilization, space, and overall energy consumption.

Appliances 504 are hardware performance accelerators that are intended for specific applications. The use of such appliances can save energy if utilized properly. For example, virtual appliances are a set of virtual machines that include optimized operating systems, "pre-built," ready-to-run applications, and embedded appliance-specific components. Sensors and meters can be categorized as smart appliances.

Operating Systems 506 can be virtualized to save energy consumption and increase operational efficiency. Operating-system-level virtualization occurs when one operating system on a machine is capable of making virtual instances of itself available as a virtual system.

Common System Services 508 such as logging, or monitoring, can contribute to energy savings. For example, visitor patterns can be logged that trigger events to control power within a specific building location.

Storage Services 510 contribute to greening the IT environment if utilized properly. For example, technologies such as the Storage Area Network (SAN) Volume Controller (SVC) bring storage devices in a SAN together in a virtual pool. This makes storage appear as one logical device for management. To the connected computers, SVC offers virtual disks as ordinary devices.

Cloud Services 512 can be energy efficient and are considered strong enablers for both green and dynamic enterprises. The use of virtual PCs (a form of PaaS), with little desktop processing or storage, can lead to less power consumption than conventional PCs and reduce technical support costs. In FIG. 5, all of the Technology Architecture and its infrastructure components can be made available or used (to save energy expenses) as Cloud Services (IaaS).

Platform Services 514 such as blade servers offer different levels of energy efficiency. In general, blade servers provide a smaller form factor and a better footprint than other types of servers. In the exemplar shown in FIG. 5, some of the Platform Services 514 are identified as Cloud Services 516.

Network Services 518 also consume power and produce heat. There are several ways to reduce energy in network components including the consolidation of multiple small switches into a single larger switch.

Data Centers, Buildings, and Facility Services 520 guide stakeholders to architect their enterprise IT environments so that utility consumption and resource capacity are optimized. Example components within this ABB are systems that manage a building's Heating, Ventilating and Air Conditioning (HVAC), lighting, power, energy, and security and access control.

Management and Security components 522 are used to green the IT system by providing unified and automated approaches to managing an IT infrastructure. With IEA, server consolidation is a Service Management activity and a form of energy and capacity optimization. Monitors are also designed to reduce energy consumption. Security is also part of IEA designs for greening the IT infrastructure because of the efficiencies provided when structure and architectural foundations are established before technology implementations. This approach will prevent disruptive integration of security systems and contribute to more thorough planning throughout the entire IEA lifecycle.

Sensing and Metering Devices 524 are utilized to manage and measure service performance, eliminate outages, and ultimately optimize enterprise costs. As a smart appliance, sensing and metering devices can be used to detect electrical leakages, and to conduct self-healing (as in the case of self-healing intelligent utility networks that are able to take action and repair themselves).

Lifecycle Tools 526 such as power-efficient developer workstations can be utilized to save energy, as can as tools that enable and automate governance of assets so that SLAs (service-level agreements) remain viable.

IEA for Information Intelligence

IEA for Information Intelligence includes analytics, architectural components, and design patterns for an IT system and empowers clients, partners, suppliers, and employees by increasing insight into ongoing business risks and opportunities. This is accomplished with ABBs and components that enable transformation of heterogeneous and raw data into predictive models and business decisions.

There are six common ABBs that make up an IEA for Information Intelligence: data sources, data access services, algorithms, analytics, decision support services (DSS), and user interface (UI) design and visualization.

Data Sources provide structured and unstructured raw data from various internal and external sources and physical devices such as internal databases, social media, sensors, meters, cell-phones, etc.

Data Access Services provide support for collecting and federating digital information from various internal and external sources to include social media feeds and user-generated content such as blogs.

Algorithms provide the foundations for the analytics layer, with the algorithm categories of search and indexing and data mining.

Analytics are text mining and semantics technologies that are used to discover patterns, relationships, and insights into data and events, and include predictive modeling. Sentiment mining will extract opinion-related information from text.

Decision Support Services (DSS) describe analytics applications and/or patterns that enable data-based decision making. Early-warning monitoring is a part of DSS that provides insights into facts that may be associated with an event (e.g., detection of sudden deterioration in quality and/or quantity of water supplies) and that provide timely responses (e.g. regarding unsuspected threats on water quality).

UI Design and Visualization represents the various user related interfaces that highlight behavioral interactions and personalization. Context-aware user interface examples can be found for mobile devices that use multiple displays, operating systems, and platforms for portability.

Figure 6:
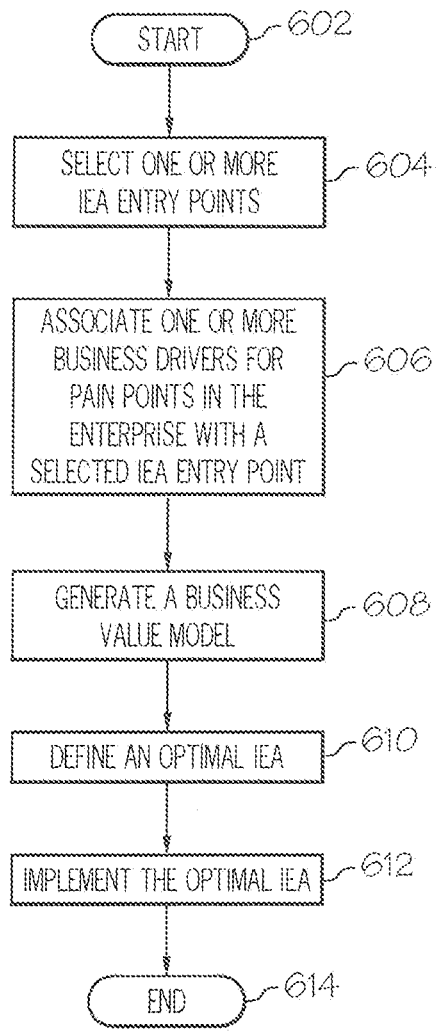
FIG. 6 is a high-level flow chart depicting exemplary steps taken to define and implement an IEA for an enterprise.

With reference now to FIG. 6, a high-level flow chart of exemplary steps taken to define an intelligent enterprise architecture (IEA) for an enterprise is presented. After initiator block 602, one or more IEA entry points are selected (block 604). Each of the IEA entry points represents a starting point for defining the IEA. As described herein, the IEA is an architectural development process for defining an enterprise computing architecture within a smart computing system. The smart computing system is instrumented using sensors that sense states of entities within and outside of the smart computing system, and is interconnected with other computing systems. Furthermore, the smart computing system has intelligence to predict future events based on changes to the sense states of entities within (e.g., servers, storage devices, communication busses, etc.) and outside (e.g., equipment and/or services being provided for or by the enterprise) of the smart computing system.

As described herein, there are at least four IEA entry points. One exemplary IEA entry point is an IEA for cloud entry point to implement an IEA for cloud. IEA for cloud augments an existing enterprise architecture of the enterprise with capabilities that enable the enterprise to dynamically provision and de-provision information technology operations by providing an architectural structure, delivery roadmaps, and guidance for cloud computing services adoption. In one embodiment, wherein the IEA for cloud is defined by: determining enterprise capabilities and types of cloud services that are desired for the enterprise; defining enterprise cloud deployment as being on-premise (private), externally hosted (public), or a combination of private and public (hybrid); describing current and future business and technology architecture building blocks for each of architectural domain of the IEA; capturing enterprise service level requirements, agreements, and performance targets of the enterprise; defining and updating an IEA government and management (IEAGM) to include IEA for cloud principles, standards, and plans for validating conformance and decision making; and producing a transition plan and roadmap for implementing the IEA for Cloud.

Another exemplary IEA entry point is an IEA for social computing to implement an IEA for social computing. As described above, the IEA for social computing comprises strategies for enabling collaboration between employees, consumers, and clients of the enterprise.

Another exemplary IEA entry point is an IEA for green and beyond entry point to implement an IEA for green and beyond. The IEA for green and beyond optimizes a use of energy by said entities within (e.g., servers, etc.) and outside (e.g., equipment used by an enterprise) of the smart computing system.

Another exemplary IEA entry point is an IEA for information intelligence entry point to implement an IEA for information intelligence. In one embodiment, the IEA for information intelligence comprises: data sources that provide structured and unstructured raw data from internal sources, external sources; data access services that provide support for collecting and federating digital information from internal and external sources to include social media feeds and user-generated content; algorithms that provide foundations for an analytics layer of the IEA, wherein the analytics layer utilizes text mining and semantics technologies to discover patterns, relationships, and insights into data and events to generate predictive models of events experienced by the enterprise; decision support services (DSS) that describe analytics applications and patterns that enable data-based decision making by the IEA; and user interface design and visualization that represent user related interfaces that highlight behavioral interactions and personalization.

As described in block 606, one or more business drivers for pain points in the enterprise are associated with a selected IEA entry point. These business drivers are enterprise requirements for meeting a mandate for the enterprise. These enterprise requirements for meeting a mandate for the enterprise can be set by a governmental entity (e.g., the setting of a maximum amount of carbon that an enterprise can emit through operations and/or energy usage), or they can be set by the enterprise itself (e.g., as a goal of reducing costs by a target amount, etc.).

As described in block 608, a business value model is then generated. This business value model is utilized to focus a scope of the business drivers for the selected IEA entry point. In one embodiment, the business value model is generated by: reviewing a component business model of activities performed within the enterprise; capturing detailed information about the business drivers, wherein the detailed information describes one or more adversities that are expected for the enterprise if an existing enterprise architecture for the enterprise remains unchanged; in response to the business drivers matching key performance indicators of the enterprise, completing the business value model using captured detailed information about the business drivers to generate a completed business value model; and inputting the completed business value model to a business architecture and a business governance of the IEA, wherein the business architecture defines a business strategy, governance, organization, and key business processes of the enterprise, and wherein the business governance manages, monitors, and steers the enterprise and the IEA to deliver pre-defined business outcomes.

As described in block 610, a processor then executes instructions to define an optimal IEA that satisfies the business drivers to ameliorate the pain points in the enterprise. This optimal IEA can then be implemented as a software simulation and/or a physical system (block 612). The process ends at terminator block 614.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of implementing an intelligent enterprise architecture for an enterprise, as an architectural development process defining an enterprise computing architecture within a smart computing system, the computer-implemented method comprising:

selecting, by one or more computer hardware processors, a plurality of intelligent enterprise architecture entry points comprising:

an intelligent enterprise architecture for cloud entry point to dynamically provision and de-provision information technology operations, to align business and technology, and to identify an impact of cloud computing services on enterprise architecture domains;

an intelligent enterprise architecture for social computing entry point to enable virtual collaboration between employees, consumers, and clients of the enterprise using simulated environments, security services, location-aware services and context aware services, to manage electricity in a smart grid, to respond to user health alerts, and to address data cohabitation security threats;

an intelligent enterprise architecture for green and beyond entry point that saves energy, optimizes water use and reduces carbon emissions by virtualizing hardware appliances, establishing consumption patterns, consolidating network switches and sensing electrical leakages; and an intelligent enterprise architecture for information intelligence entry point for collecting and federating digital information from internal and external sources to include social media feeds and user-generated content and for discovering patterns, relationships, and insights into events to enable decision making by the intelligent enterprise architecture;

associating, by one or more computer hardware processors, one or more business drivers for pain points in the enterprise with the selected plurality of intelligent enterprise architecture entry points, using a business value model to focus a scope of the business drivers for the selected intelligent enterprise architecture entry points, the business value model generated by reviewing a component business model of activities performed within the enterprise and capturing detailed information about the business drivers describing one or more adversities that are expected for the enterprise if an existing enterprise architecture for the enterprise remains unchanged;

defining, by one or more computer hardware processors, the intelligent enterprise architecture that satisfies the associated business drivers to ameliorate the pain points in the enterprise; and implementing, by one or more computer hardware processors, the intelligent enterprise architecture as a software simulation or a physical system.

2. The computer-implemented method of claim 1, wherein the intelligent enterprise architecture for cloud entry point enables delivery and consumption of:
business processes as cloud services, which are pre-defined business processes that are executed in part by a service provider on behalf of a loan origination process;
software applications as cloud services, which are pre-defined applications that support the cloud services;
platforms as cloud services, which are pre-defined middleware systems that support the software applications and
infrastructure as cloud services, which are pre-defined infrastructure components that provide computational and storage infrastructure as a centralized, location-independent service.

3. The computer-implemented method of claim 1, wherein the intelligent enterprise architecture for cloud entry point enables:
determining enterprise capabilities and types of cloud services that are desired for the enterprise;
defining enterprise cloud deployment as being on-premise, externally hosted, or a combination of private and public enterprise cloud deployment;
describing current and future business and technology architecture building blocks for each architectural domain of the intelligent enterprise architecture;
capturing enterprise service level requirements, agreements, and performance targets of the enterprise;
defining and updating an intelligent enterprise architecture government and management to include intelligent enterprise architecture for cloud principles, standards, and plans for validating conformance and decision making; and
producing a transition plan and roadmap for implementing the intelligent enterprise architecture for cloud.

4. The computer-implemented method of claim 1, wherein the intelligent enterprise architecture for green and beyond entry point enables energy use optimization by physical entities within and outside of the smart computing system.

5. The computer-implemented method of claim 1, wherein the intelligent enterprise architecture for green and beyond entry point enables water use optimization by physical entities within and outside of the smart computing system.

6. The computer-implemented method of claim 1, wherein the intelligent enterprise architecture for information intelligence entry point implements an intelligent enterprise architecture for information intelligence, that further comprises:

data sources that provide structured and unstructured raw data from internal sources, external sources;
data access services that provide support for collecting and federating digital information from internal and external sources to include social media feeds and user-generated content, wherein the data access services facilitate sense-and-respond activities in real-time for a human resource by sending a notification to a mobile device alerting the human resource that pollen levels in an area are high and alerting the human resource to a probability of an allergic reaction based on a published user-profile of the human resource;
algorithms that provide foundations for an analytics layer of the intelligent enterprise architecture, wherein the analytics layer utilizes text mining and semantics technologies to discover patterns, relationships, and insights into data and events to generate predictive models of events experienced by the enterprise;
decision support services that describe analytics applications and patterns that enable data-based decision making by the intelligent enterprise architecture; and
user interface design and visualization that represent user related interfaces that highlight behavioral interactions and personalization.

7. A computer system implementing an intelligent enterprise architecture for an enterprise, wherein the intelligent enterprise architecture is an architectural development process for defining an enterprise computing architecture within a smart computing system, the computer system comprising:
a central processing unit, a computer readable memory, and a non-transitory computer readable storage medium;
first program instructions to select a plurality of intelligent enterprise architecture entry points comprising:
an intelligent enterprise architecture for cloud entry point to dynamically provision and de-provision information technology operations, to align business and technology, and to identify an impact of cloud computing services on enterprise architecture domains;
an intelligent enterprise architecture for social computing entry point to enable virtual collaboration between employees, consumers, and clients of the enterprise using simulated environments, security services, location-aware services and context aware services, to manage electricity in a smart grid, to respond to user health alerts, and to address data cohabitation security threats;
an intelligent enterprise architecture for green and beyond entry point that saves energy, optimizes water use and reduces carbon emissions by virtualizing hardware appliances, establishing consumption patterns, consolidating network switches and sensing electrical leakages; and
an intelligent enterprise architecture for information intelligence entry point for collecting and federating digital information from internal and external sources to include social media feeds and user-generated content and for discovering patterns, relationships, and insights into events to enable decision making by the intelligent enterprise architecture;
second program instructions to associate one or more business drivers for pain points in the enterprise with the selected plurality of intelligent enterprise architecture entry points, using a business value model to focus a scope of the business drivers for the selected intelligent enterprise architecture entry points, the business value model generated by reviewing a component business model of activities performed within the enterprise and capturing detailed information about the business drivers describing one or more adversities that are expected for the enterprise if an existing enterprise architecture for the enterprise remains unchanged;

third program instructions to define the intelligent enterprise architecture that satisfies the associated business drivers to ameliorate the pain points in the enterprise; and fourth program instructions to implement the intelligent enterprise architecture as a software simulation or a physical system; and wherein the first, the second, the third and the fourth program instructions are stored on the non-transitory computer readable storage medium for execution by the central processing unit via the computer readable memory.

8. The computer system of claim 7, wherein the intelligent enterprise architecture for cloud entry point implements an intelligent enterprise architecture for cloud, wherein the intelligent enterprise architecture for cloud enables intelligent enterprise architecture for cloud services that enable delivery and consumption of business processes as cloud services, which are pre-defined business processes that are executed in part by a service provider on behalf of a loan origination process; software applications as cloud services, which are pre-defined applications that support the cloud services; platforms as cloud services, which are pre-defined middleware systems that support the software applications; and infrastructure as cloud services, which are pre-defined infrastructure components that provide computational and storage infrastructure as a centralized, location-independent service.

9. The computer system of claim 7, wherein the intelligent enterprise architecture for cloud entry point enables:

determining enterprise capabilities and types of cloud services that are desired for the enterprise;

defining enterprise cloud deployment as being on-premise, externally hosted, or a combination of private and public enterprise cloud deployment;

describing current and future business and technology architecture building blocks for each architectural domain of the intelligent enterprise architecture;

capturing enterprise service level requirements, agreements, and performance targets of the enterprise;

defining and updating an intelligent enterprise architecture government and management to include intelligent enterprise architecture for cloud principles, standards, and plans for validating conformance and decision making; and producing a transition plan and roadmap for implementing the intelligent enterprise architecture for cloud.

10. A computer program product for implementing an intelligent enterprise architecture for an enterprise, the computer program product comprising: a non-transitory computer readable storage medium which, when executed by one or more computer hardware processors implements:

first program instructions to select a plurality of intelligent enterprise architecture entry points comprising:

an intelligent enterprise architecture for cloud entry point to dynamically provision and de-provision information technology operations, to align business and technology, and to identify an impact of cloud computing services on enterprise architecture domains;

an intelligent enterprise architecture for social computing entry point to enable virtual collaboration between employees, consumers, and clients of the enterprise using simulated environments, security services, location-aware services and context aware services, to manage electricity in a smart grid, to respond to user health alerts, and to address data cohabitation security threats;

an intelligent enterprise architecture for green and beyond entry point that saves energy, optimizes water use and reduces carbon emissions by virtualizing hardware appliances, establishing consumption patterns, consolidating network switches and sensing electrical leakages; and an intelligent enterprise architecture for information intelligence entry point for collecting and federating digital information from internal and external sources to include social media feeds and user-generated content and for discovering patterns, relationships, and insights into events to enable decision making by the intelligent enterprise architecture;

second program instructions to associate one or more business drivers for pain points in the enterprise with the selected plurality of intelligent enterprise architecture entry points, using a business value model to focus a scope of the business drivers for the selected intelligent enterprise architecture entry points, the business value model generated by reviewing a component business model of activities performed within the enterprise and capturing detailed information about the business drivers describing one or more adversities that are expected for the enterprise if an existing enterprise architecture for the enterprise remains unchanged;

third program instructions to define the intelligent enterprise architecture that satisfies the associated business drivers to ameliorate the pain points in the enterprise; and fourth program instructions to implement the intelligent enterprise architecture as a software simulation or a physical system; and wherein the first, the second, the third and the fourth program instructions are stored on the non-transitory computer readable storage medium.

11. The computer-implemented method of claim 1, wherein the business drivers are enterprise requirements for meeting a mandate for the enterprise set by a governmental entity.

12. The computer-implemented method of claim 1, wherein the smart computing system has intelligence to predict future events based on changes to the sense states of physical entities within and outside of the smart computing system.

13. The computer-implemented method of claim 1, wherein the smart computing system is interconnected with other computing systems.

14. The computer-implemented method of claim 1, wherein the smart computing system is instrumented using sensors that sense states of physical entities within and outside of the smart computing system.

* * * * *